(12) United States Patent
Lee et al.

(10) Patent No.: US 12,425,181 B2
(45) Date of Patent: Sep. 23, 2025

(54) USING HOMOMORPHIC ENCRYPTION WITH PRIVATE VARIABLES

(71) Applicant: SEOUL NATIONAL UNIVERSITY R&DB FOUNDATION, Seoul (KR)

(72) Inventors: Jae Wook Lee, Seoul (KR); Jun Young Byun, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 464 days.

(21) Appl. No.: 17/853,798

(22) Filed: Jun. 29, 2022

(65) Prior Publication Data

US 2023/0081162 A1 Mar. 16, 2023

(30) Foreign Application Priority Data

Aug. 24, 2021 (KR) .................. 10-2021-0111809

(51) Int. Cl.
*H04L 9/00* (2022.01)
*G06F 18/2415* (2023.01)

(52) U.S. Cl.
CPC .......... *H04L 9/008* (2013.01); *G06F 18/2415* (2023.01)

(58) Field of Classification Search
CPC . H04L 9/008; H04L 2209/46; H04L 63/0428; H04L 9/14; H04L 9/0894; H04L 9/0825; H04L 9/0618; H04L 9/3093; H04L 9/085; H04L 2209/08; H04L 63/0442; H04L 9/0869; H04L 9/3239; H04L 9/3297; H04L 9/50; H04L 9/0637; H04L 9/0643; H04L 9/0819; H04L 9/0861; H04L 9/3218; H04L 9/3221; H04L 9/3231; H04L 9/3247; H04L 9/3073; H04L 9/3066; G06F 21/6245; G06F 21/602; G06F 21/64; G06F 18/214; G06F 21/6254; G06F 21/604; G06F 40/40; G06F 18/217; G06F 18/24; G06F 18/241; G06F 16/27; G06F 16/3344; G06F 17/17; G06F 17/18; G06F 18/213;
(Continued)

(56) References Cited

U.S. PATENT DOCUMENTS

2012/0201378 A1\* 8/2012 Nabeel .................. H04L 9/008
380/255
2016/0036584 A1 2/2016 Nikolaenko et al.
(Continued)

FOREIGN PATENT DOCUMENTS

JP 2019514301 5/2019
KR 101919940 11/2018
KR 20210067958 6/2021

OTHER PUBLICATIONS

Byun, et al., Parameter-free HE-friendly Logistic Regression, 35th Conference on Neural Information Processing Systems (NeurIPS 2021).

*Primary Examiner* — Djenane M Bayard
(74) *Attorney, Agent, or Firm* — CANTOR COLBURN LLP

(57) ABSTRACT

Provided is homomorphic encryption data processing method and apparatus and relates to homomorphic encryption data processing method and apparatus that set weighted values to a segment classification value (a logit value) and a distribution value of a dataset including a homomorphic encryption and uses weighted values to perform computation and learning of data in a state in which the homomorphic encryption is maintained.

17 Claims, 12 Drawing Sheets

(58) Field of Classification Search
CPC ........ G06F 18/22; G06F 18/253; G06F 21/10;
G06F 21/32; G06F 40/151; G06F 16/25;
G06F 16/3346; G06F 16/35; G06F
16/9024; G06F 17/16; G06F 18/23; G06F
21/16; G06F 21/6218; G06F 2221/2141;
G06F 40/216; G06F 40/284; G06F 40/30;
G06F 21/577; G06F 21/606; G06F
21/6263; G06F 21/57
See application file for complete search history.

(56) References Cited

U.S. PATENT DOCUMENTS

| | | | | |
|---|---|---|---|---|
| 2017/0293913 | A1* | 10/2017 | Gulak | G06Q 20/3829 |
| 2020/0036512 | A1* | 1/2020 | Vaikuntanathan | H04L 63/08 |
| 2020/0228336 | A1* | 7/2020 | Streit | H04L 9/3231 |
| 2021/0135837 | A1* | 5/2021 | Cheung | H04L 9/3066 |
| 2021/0150266 | A1* | 5/2021 | Sarpatwar | G06F 18/24 |

* cited by examiner

*FIG. 5*

Algorithm 1 Basic Algorithms

1: KeyGen($1^\lambda$) → (sKey, pKey, evKey) ▷ Key generation
2: Encode($\vec{z}$) → $m \in \mathcal{R}$ ▷ Complex vector to polynomial ring
3: Decode($m$) → $\vec{z} \in \mathbb{C}^{N/2}$ ▷ Polynomial ring to complex vector
4: Encrypt(pKey, $m$) → $c$ ▷ Encryption
5: Decrypt(sKey, $c$) → $m$ ▷ Decryption

*FIG. 6*

---
Algorithm 2 Operation Algorithms
---
1: ConstAdd($c, v \in \mathcal{R}) \to c_{add}$ ▷ Addition between ciphertext and plaintext
2: Add($c, c'$) $\to c_{add}$ ▷ Addition between ciphertexts
3: ConstMult($c, v \in \mathcal{R}) \to c_{mult}$ ▷ Multiplication between ciphertext and plaintext
4: Mult(evKey, $c, c'$) $\to c_{Mult}$ ▷ Multiplication between ciphertexts
---

FIG. 7

Algorithm 3 Ridge Regression for one Sensitive Variable

1: procedure generateEtaXi($h_s$, {$u_i$}, {$\sigma_i$}, y, $\lambda$)  ▷ calculate $\eta$ and $\xi$
2:    for $i$ in $1, \ldots, p$ do
3:       $tmp \leftarrow$ ConstMult($h_s$, $u_i$)
4:       for $j$ in $1, \ldots, \log_2 n$ do
5:          $tmp\_rot \leftarrow$ IRotate($tmp$, $2^j$)
6:          $tmp \leftarrow$ Add($tmp$, $tmp\_rot$)
7:       end for
8:       $tmp2 \leftarrow$ Mult($tmp$, $tmp$)
9:       $tmp \leftarrow$ ConstMult($tmp$, $-\frac{\sigma_i^2 u_i^T y}{\lambda(\sigma_i^2+\lambda)}$)
10:      $tmp2 \leftarrow$ ConstMult($tmp2$, $-\frac{\sigma_i^2}{\lambda(\sigma_i^2+\lambda)}$)
11:      if i=0 then
12:         $\eta \leftarrow tmp$
13:         $\xi \leftarrow tmp2$
14:      else
15:         $\eta \leftarrow$ Add($\eta$, $tmp$)
16:         $\xi \leftarrow$ Add($\xi$, $tmp2$)
17:      end if
18:    end for
19:    $tmp3 \leftarrow$ ConstMult($h_s$, $\frac{1}{\lambda}y$)
20:    $tmp4 \leftarrow$ Mult($h_s$, $h_s$)
21:    $tmp4 \leftarrow$ ConstMult($tmp4$, $\frac{1}{\lambda}$)
22:    for $j$ in $1, \ldots, \log_2 n$ do
23:       $tmp3\_rot \leftarrow$ IRotate($tmp3$, $2^j$)
24:       $tmp3 \leftarrow$ Add($tmp3$, $tmp3\_rot$)
25:       $tmp4\_rot \leftarrow$ IRotate($tmp4$, $2^j$)
26:       $tmp4 \leftarrow$ Add($tmp4$, $tmp4\_rot$)
27:    end for
28:    $\eta \leftarrow$ Add($\eta$, $tmp3$)
29:    $\xi \leftarrow$ Add($\xi$, $tmp4$)
30:    return ($\eta$, $\xi$)
31: end procedure

FIG. 8

Algorithm 4 Ridge Regression for one Sensitive Variable

1: procedure ridgeEstimate($h_x$, $\{u_i\}$, $\{\sigma_i\}$, $y$, $\lambda$, $\tau$)  ▷ calculate the ridge estimate
2:     for $i$ in $1, \ldots, p$ do
3:         $tmp \leftarrow$ ConstMult($h$, $u_i$)
4:         for $j$ in $1, \ldots, \log_2 n$ do
5:             $tmp\_rot \leftarrow$ lRotate($tmp$, $2^j$)
6:             $tmp \leftarrow$ Add($tmp$, $tmp\_rot$)
7:         end for
8:         $tmp \leftarrow$ ConstMult($tmp$, $-\frac{\sigma_i^2 u_i}{\sigma_i^2 + \lambda}$)
9:         if $i=0$ then
10:            $\hat{f} \leftarrow tmp$
11:         else
12:            $\hat{f} \leftarrow$ Add($\hat{f}$, $tmp$)
13:         end if
14:     end for             ▷ calculate
15:     $\hat{f} \leftarrow$ Add($\hat{f}$, $h_x$)
16:     $(\eta, \xi) \leftarrow$ generateEtaXi($h_x$, $\{u_i\}$, $\{\sigma_i\}$, $y$, $\lambda$))
17:     $\hat{f} \leftarrow$ Mult($\hat{f}$, $h_x$)
18:     $\xi \leftarrow$ ConstAdd($\xi$, 1)
19:     $\xi \leftarrow$ Inv($\xi$, $\tau$)
20:     $\hat{f} \leftarrow$ Mult($\hat{f}$, $\eta$)
21:     $\hat{f} \leftarrow$ Mult($\hat{f}$, $\xi$)
22:     $\hat{f} \leftarrow$ ConstAdd($\hat{f}$, $\sum_{i=1}^{p} \frac{\sigma_i^2}{\sigma_i^2+\lambda} u_i(u_i^T y)$)
23:     return $\hat{f}$
24: end procedure

*FIG. 9A*

| $h_1$ | $h_\ell$ | |
|---|---|---|
| $S_{11}$ ... | $S_{1\ell}$ | $X_1$ |
| $S_{21}$ ... | $S_{2\ell}$ | $X_2$ |
| ... ... | ... | ... |
| $S_{n1}$ ... | $S_{n\ell}$ | $X_n$ |

Packing

*FIG. 9B*

| $h_1$ | $h_2$ | ... | $h_n$ |
|---|---|---|---|

\+

| $g_1$ | $g_2$ | ... | $g_n$ |
|---|---|---|---|

=

| $h_1+g_1$ | $h_2+g_2$ | ... | $h_n+g_n$ |
|---|---|---|---|

Addition

Multiplication

USING HOMOMORPHIC ENCRYPTION WITH PRIVATE VARIABLES

BACKGROUND

1. Technical Field

An embodiment of the present disclosure relates to method and apparatus for securing private variables by using homomorphic encryption, and more particularly, to method and apparatus for performing regression analysis by encrypting only private variables required for security among various variables.

2. Related Art

In recent years, machine learning has made remarkable achievement in almost every field including autonomous driving, marketing, and finance. Success of the machine learning has greatly increased the number of public data as well as improving performance of calculation and storage functions represented by graphics processing units (GPUs).

In this regard, companies and institutions make various efforts to collect data from various sources, particularly individuals. However, individual data includes personal information, and thus, concerns about privacy infringement are raised. Individuals may not want others to use their personal information for any reason, and even when the individuals agree to provide such information, unwanted leakage of personal information may occur when a database is attacked.

Therefore, applying security technology to data disclosure is no longer optional, but mandatory. Various security technologies for personal information have been proposed, and research on a homomorphic encryption method has increased recently as a method of solving this problem.

Homomorphic encryption is a fourth-generation encryption technology, and unlike existing encryption methods, data may be combined, computed, and analyzed in an encryption state and may be applied to all fields that require data security.

Homomorphic encryption may perform addition and multiplication on encrypted data without a decryption process. Therefore, by utilizing homomorphic encryption, a client may delegate calculations to an untrusted cloud server, transmit encrypted input data to the server, and perform all calculations without any additional queries. As such, homomorphic encryption provides a simple and secure delegation structure of calculations for personal data.

However, when homomorphic encryption is used for machine learning, there is a problem in terms of time and storage efficiency. For example, there is a problem that it takes several days when a homomorphic ciphertext is used in a learning process which may be achieved in minutes with a general text.

SUMMARY

Method and apparatus for securing private variables by using homomorphic encryption, according to an embodiment of the present disclosure may perform regression analysis by encrypting only private variables that require security among various variables.

However, the technical tasks to be achieved by the present embodiment are not limited to the technical tasks described above, and other technical tasks may exist.

A homomorphic encryption data processing method according to the present disclosure includes deriving a first classification value which is a segment classification value of a dataset including homomorphic encryption by inputting a dataset of data including the homomorphic encryption to a segment classification module that classifies whether the data is about what kind of information, deriving a first distribution average value of the first classification value and deriving a second distribution average value by adding a weighted value to the first distribution average value, deriving a second classification value by using the second distribution average value, and performing computation of data including the homomorphic encryption by using the second classification value and the second distribution average value.

In addition, the deriving of the first classification value may include extracting a first logit of the dataset including the homomorphic encryption, and setting, as the first classification value, a value corresponding to probability that the data of the dataset including the homomorphic encryption from the first logit is classified into any one of the segements.

In addition, the deriving of the second distribution average value may include deriving a third classification value that is a segment classification value of a dataset that does not include the homomorphic encryption by inputting the dataset of the data that do not include the homomorphic encryption to the segement classification module, deriving a third distribution average value that is a distribution average value of the third classification value, and setting the weighted value such that the first distribution average value is equal to the third distribution average value by performing average fitting of the first distribution average value and the third distribution average value.

In addition, the performing of the computation of the data including the homomorphic encryption may include storing a first dataset including data including the homomorphic encryption and data that do not include the homomorphic encryption as a slot, calculating an estimation value for a previously stored linear model by applying the homomorphic encryption data and the non-homomorphic encryption data in the first dataset to the linear model, and transmitting the calculated estimation value to an external apparatus.

In addition, the calculating of the estimation value may include extracting a term using the homomorphic encryption data from among polynomials required for calculating the estimation value of the linear model and calculating the estimation value by performing homomorphic computation for the extracted term.

In addition, the calculating of the estimation value may include generating a matrix corresponding to the first dataset, decomposing the matrix into a first matrix including the homomorphic encryption data and a second matrix that does not include the homomorphic encryption data, enabling the second matrix to be orthogonal to the first matrix, and calculating the estimation value for the linear model by using the first matrix and the second matrix.

BRIEF DESCRIPTION OF THE DRAWINGS

Various embodiments of the present disclosure will become more apparent in view of the attached drawings and accompanying detailed description, in which:

FIG. 5 illustrates a basic operation for a homomorphic ciphertext, according to an embodiment;

FIG. 6 illustrates an example of a processing function for a homomorphic ciphertext, according to an embodiment;

FIG. 7 illustrates an intermediate value calculation algorithm for ridge regression according to an embodiment;

FIG. 8 illustrates an algorithm for calculating a result of ridge regression by using a calculated intermediate value, according to an embodiment;

FIGS. 9A to 9C illustrate a computation operation using a packing operation for a homomorphic ciphertext, according to an embodiment;

FIG. 10 is a graph illustrating performance of a ridge regression operation according to the embodiment;

DETAILED DESCRIPTION OF THE EMBODIMENTS

Figure 1:
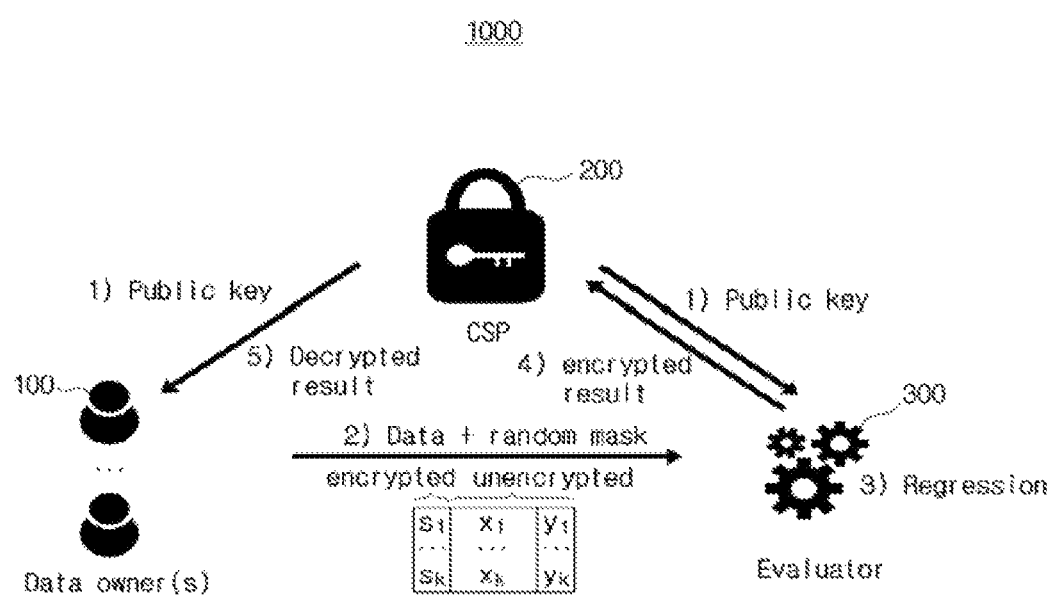
FIG. 1 is a diagram illustrating a structure of a network system according to an embodiment.

Hereinafter, embodiments of the present disclosure will be described in detail with reference to the accompanying drawings such that those skilled in the art may easily implement the embodiments. However, the present disclosure may be embodied in several different forms and is not limited to the embodiments described herein. In order to clearly describe the present disclosure in the drawings, parts irrelevant to the description are omitted, and similar reference numerals are attached to similar components throughout the specification.

Throughout the specification, when a portion is "connected" or "coupled" to another portion, this includes not only a case of being "directly connected or coupled" but also a case of being "electrically connected" with another element interposed therebetween. In addition, when a portion "includes" a certain component, this means that other components may be further included therein rather than excluding other components, unless otherwise stated.

In addition, the accompanying drawings are only for easy understanding of the embodiments disclosed in the present specification, and the technical idea disclosed herein is not limited by the accompanying drawings, and should be understood to include all changes, equivalents, or substitutes included in the idea and scope of the present disclosure.

Terms including an ordinal number, such as first, second, and so on may be used to describe various components, but the components are not limited by the terms. The above terms are used only for the purpose of distinguishing one component from another component.

When it is described that a component is "connected" or "coupled" to another component, it should be understood that the component may be directly connected or coupled to another component, but other components may exist therebetween. Meanwhile, when it is described that a certain component is "directly connected" or "directly coupled" to another component, it should be understood that other elements do not exist therebetween.

The singular expression includes the plural expression unless the context clearly dictates otherwise.

In the present application, terms such as "include" or "have" are intended to designate that there are features, numbers, steps, operations, configuration elements, component, or combinations thereof described in the specification, and it should be understood that the present disclosure does not preclude possibility of addition or existence of one or more other features, numbers, steps, operations, configuration elements, components, or combinations thereof.

An information (data) transmission process performed in the present application may be subjected to encryption/decryption as necessary, and in the present disclosure and claims, expressions describing the information (data) transmission process should be construed to include cases of encryption/decryption even when not separately described. In the present disclosure, expressions such as "transmission (transfer) from A to B" or "A receives from B" include transmission (transfer) or reception with another medium therebetween, and do not mean only what is transmitted (transferred) or received directly from A to B.

In describing the present disclosure, the order of respective steps should be understood as non-limiting unless the preceding step has to be logically and temporally performed before the subsequent step. That is, except for the above exceptional cases, even when a process described as a subsequent step is performed before the process described in the preceding step, essence of the disclosure is not affected, and the scope of rights should also be defined regardless of the order of steps. In addition, in the present specification, description of "A or B" is defined as meaning not only selectively pointing to any one of A and B, but also including both A and B. In addition, in the present disclosure, a term "comprising or including" has the meaning of encompassing inclusion of other components in addition to elements listed as being included.

In the present disclosure, only essential components required for describing the present disclosure are described, and components not related to the essence of the present disclosure are not described. In addition, the essential components should not be construed in an exclusive sense including only the described components, but in a non-exclusive sense that may also include other components.

In addition, in the present disclosure, a "value" is defined as a concept including a vector as well as a scalar value.

The mathematical computation and calculation of respective steps of the present disclosure to be described below may be implemented as computer computation by a known coding method for performing corresponding computation or calculation and/or coding suitable for the present disclosure.

Specific equations to be described below are illustratively described among possible alternatives, and the scope of the present disclosure should not be construed as being limited to the equations described in the present disclosure.

Hereinafter, a structure of a network system according to an embodiment will be described with reference to FIG. 1.

FIG. 1 is a diagram illustrating a structure of a network system according to an embodiment.

Referring to FIG. 1, a network system 1000 may include a user terminal 100, a first server 200, and a second server 300, which may be connected to each other through a network.

Here, the network may include various types of wired and wireless communication networks such as a broadcast communication network, an optical communication network, a cloud network, and respective devices may also be connected to each other through, for example Wi-Fi, Bluetooth, near field communication (NFC), and so on without separate media.

Although one user terminal 100 is illustrated in FIG. 1, a plurality of user terminals 100 may be include in the network system 1000. For example, the user terminal 100 may be implemented as various types of devices such as a smartphone, a tablet, a game player, a personal computer (PC), a laptop PC, a home server, and a kiosk, and the user terminal 100 may also be implemented in the form of a home appliance to which an Internet of things (IoT) function is applied.

The user terminal 100 illustrated in FIG. 1 may be referred to as a data owner, the first server 200 may be referred to as a crypto-service provider (CSP), and the second server 300 may be referred to as a machine learning service provider (MLSP).

The first server 200 may generate a secret key and a public key required for homomorphic encryption and may provide the generated public key to the second server 300 and the user terminal 100. Specifically, the first server 200 may generate a secret key and a public key based on various parameters required for homomorphic encryption. A detailed operation of generating the secret key and the public key will be described below with reference to FIG. 5.

Figure 2:
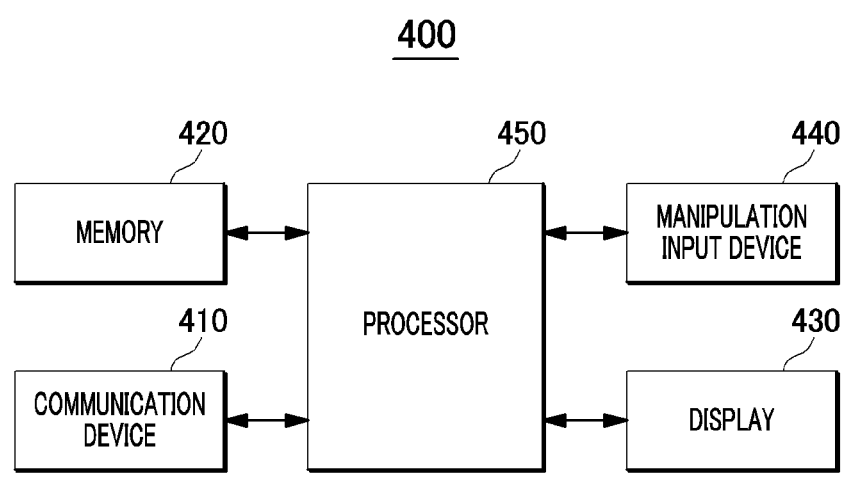
FIG. 2 is a block diagram illustrating a configuration of a computing apparatus according to an embodiment.

A user may input various types of information through the user terminal 100 used by the user. The input information may be stored in the user terminal 100 or may be transmitted to an external apparatus for reasons of storage capacity and security to be stored therein. In FIG. 2, the second server 300 may serve to store the information.

The user terminal 100 may encrypt personal information by using a received public key and provide the encrypted personal information to the second server 300. In this case, the user terminal 100 may encrypt only the personal information that requires information protection among various pieces of information to be provided to the second server 300 by using a homomorphic encryption method and may provide the remaining information to the second server 300 without the homomorphic encryption processing.

That is, the user terminal 100 may encrypt personal information (or private variables) by using a public key and provide the encrypted personal information and unencrypted information (or variables) to the second server 300. Here, the information that requires personal information protection may be referred to as a private variable and may be one piece of information (or item) or may be a plurality of pieces of information (or a plurality of items). For example, the private variables may include age, gender, race, and so on. Items that require private information protection may be selected automatically, and items pointed out by a user may also be private variables.

The user terminal 100 may include encryption noise, that is, an error, calculated in the process of performing homomorphic encryption, in a ciphertext. Specifically, the homomorphic ciphertext generated by the user terminal 100 may be generated in a form in which a result value including a message and an error value is restored when decrypted later by using a secret key. For example, the homomorphic encryption described above may be performed by using a homomorphic encryption for arithmetic of approximate numbers (HEAAN) scheme but is not limited thereto. A detailed operation of the HEAAN scheme is described below.

The user terminal 100 received a public key may perform homomorphic encryption processing for a variable that requires security among a plurality of variables (or a plurality of pieces of personal information or a plurality of pieces of information) by using the received public key and may transmit data including a homomorphic encryption variable and a non-homomorphic encryption variable to the second server 300.

When receiving data from the user terminal 100, the second server 300 may store the received data.

In addition, the second server 300 may perform computation processing by using the stored data according to an external request or a request from the user terminal 100. Here, the computation processing may include a machine learning operation such as regression analysis. The machine learning operation is described below with reference to FIG. 2.

In addition, the second server 300 may provide a computation processing result to the first server 200. The first server 200 received the computation processing result may decrypt the computation processing result by using a secret key and transmit a result thereof to the user terminal 100.

Hereinafter, it is assumed that the first and second servers 200 and 300 described above are honest, curious, and non-collusive devices. In general, the above assumption is reasonable because a machine learning service provider and a cryptographic service provider are different companies that make money by providing service to consumers.

In addition, the first server 200 has a secret key, thereby being able to directly decrypt a final result to check the final result. To prevent this, the user terminal 100 may determine a certain vector value having the same length as the final result called a mask, encrypt the mask, and transmit data to the second server 300. As described above, the user terminal 100 may mask data and provide the data to the second server 300, and thus, even when the first server 200 decrypts the computation result by using a secret key, the first server 200 may not obtain a private variable.

In this case, the user terminal 100 may perform mask processing for the data to be transmitted before data transmission and provide the masked data to the second server 300. Details of the mask processing is described below.

As described above, the network system 1000 according to the present embodiment encrypts only items that require personal information protection, and thus, security may be processes. In addition, faster computation may be made during an analysis process in that homomorphic encryption processing is performed only for items that require personal information instead of encrypting all user information.

Meanwhile, in illustrating and describing FIG. 1, it is described that the first server 200 generates a public key and a secret key required for a ciphertext, and the user terminal 100 receives the public key to perform homomorphic ciphertext processing, but a function of the first server 200 may be performed by the user terminal 100. That is, the user terminal 100 directly generates a secret key and a public key and homomorphically encrypts information by using the generated public key and provide the homomorphically encrypted information to the second server 200, and the user terminal 100 may receive the computation result of the second server 200 and directly restore the computation result by using the secret key.

Hereinafter, a configuration of a computing apparatus according to an embodiment will be described with reference to FIG. 2.

FIG. 2 is a block diagram illustrating a configuration of a computing apparatus according to an embodiment.

Specifically, an apparatus for performing homomorphic encryption, an apparatus for calculating a key value required for a homomorphic ciphertext, and an apparatus for performing computation for a homomorphic ciphertext, which are included in the system of FIG. 1, may be referred to as computing apparatuses. The computing apparatuses may include various devices such as a PC, a notebook computer, a smartphone, a tablet, and a server.

Referring to FIG. 2, the computing apparatus 400 may include a communication device 410, a memory 420, a display 430, a manipulation input device 440, and a processor 450.

The communication device 410 may connect the computing apparatus 400 to an external apparatus (not illustrated) and may be connected to an external apparatus through a local area network (LAN) and an Internet network, as well as a Universal Serial Bus (USB) port or wireless communication (for example, Wi-Fi 802, 11a/b/g/n, near field communication (NFC), or Bluetooth) port. The communication device 410 may be referred to as a transceiver.

The communication device 410 may receive a public key from an external apparatus and may transmit the public key generated by the computing apparatus 400 to the external apparatus.

In addition, the communication device 410 may receive a message from an external apparatus and transmit a generated homomorphic ciphertext to the external apparatus.

In addition, the communication device 410 may receive various parameters required for generating a ciphertext from an external apparatus. In addition, various parameters may be directly input by a user through the manipulation input device 440 to be described below.

In addition, the communication device 410 may receive a request for computation for the homomorphic ciphertext from an external apparatus and may transmit a computed result to the external apparatus. Here, the requested computing may include addition, subtraction, multiplication, and so on or may include regression analysis computation for a plurality of data. In addition, the requested computation may include segment classification computation for determining whether the input data is about what kind of information, and computation for setting a weighted value to a distribution average of a segement classification result.

At least one instruction related to the computing apparatus 400 may be stored in the memory 420. Specifically, various programs (or software) for operating the computing apparatus 400 according to various embodiments of the present disclosure may be stored in the memory 420.

The memory 420 may be implemented in various forms such as random access memory (RAM), read-only memory (ROM), flash memory, hard disk drive (HDD), external memory, and a memory card but is not limited thereto.

The memory 420 may store a message to be encrypted. Here, the message may include various types of credit information, personal information, and so on cited by a user and may include information on a use history such as location information used in the computing apparatus 400 and Internet use time information.

In addition, the memory 420 may store a public key, and if the computing apparatus 400 is an apparatus that directly generates the public key, the memory 420 may store not only the secret key but also the public key and various parameters required for generating the secret key.

In addition, the memory 420 may store a homomorphic ciphertext generated in the process to be described below. In addition, the memory 420 may also store the same type ciphertext transmitted by an external apparatus. In addition, the memory 420 may also store a computation result ciphertext that is a result of a computing process to be described below.

In addition, the memory 420 may store a learning model required for machine learning. In addition, the memory 420 may store a computing function used in a corresponding learning model and an approximate polynomial therefor. For example, the memory 420 may store a function for a linear model such as Equations 10 and 15 to be described below. In addition, the memory 420 may store a function for segment classification computing for determining whether input data is about what kind of information and computing for setting a weighted value to a distribution average of a segment classification result.

The display 430 displays a user interface window on which a function supported by the computing apparatus 400 is selected. Specifically, the display 430 may display a user interface window on which various functions provided by the computing apparatus 400 are selected. The display 430 may include a monitor such as a liquid crystal display (LCD) and an organic light emitting diode (OLED) and may also include a touch screen on which a functions of the manipulation input device 440 to be described below may also be performed.

The display 430 may display a message requesting input of parameters required for generating a secret key and a public key. In addition, the display 430 may display a message for an encryption target to select a message or a message for selecting a private variable. In addition, the encryption target (that is, a private variable) may be directly selected by a user or may be automatically selected. That is, personal information that requires encryption may be automatically set even when a user does not directly select a message.

The manipulation input device 440 may receive a function selection of the computing apparatus 400 and a control command for a corresponding function input by a user. Specifically, the manipulation input device 440 may receive parameters required for generating a secret key and a public key from a user. In addition, the manipulation input device 440 may receive a set message to be encrypted from the user.

The processor 450 controls an overall operation of the computing apparatus 400. Specifically, the processor 450 may control the overall operation of the computing apparatus 400 by performing at least one instruction stored in the memory 420. The processor 450 may include a single device such as a central processing unit (CPU) or an application-specific integrated circuit (ASIC) or may also include a plurality of devices such as a CPU and a graphics processing unit (GPU).

When receiving a message to be transmitted, the processor 450 may store the message in the memory 420. In addition, the processor 450 may homomorphically encrypt the message by using various set values and programs stored in the memory 420. In this case, homomorphic encryption may be performed for items (private variables) that require personal information protection among a plurality of messages, and encryption processing may not be performed for items that do not require the personal information protection.

In addition, the processor 450 may perform mask processing for the plurality of messages before transmission of the plurality of messages to an external apparatus and may also transmit the masked data to the external apparatus.

The processor 450 may also generate a public key required to perform encryption or may also receive the public key from an external apparatus. For example, when a computing apparatus is the first server 200 of FIG. 1, the processor 450 may generate a secret key and a public key and transmit the generated public key to the user terminal 100 of FIG. 1.

In addition, the processor 450 may generate a homomorphic ciphertext for the message. Specifically, the processor 450 may generate a homomorphic ciphertext by applying a public key to an item that requires private protection among messages. In addition, when processing the ciphertext by using a HEAAN method, the processor 450 may generate the homomorphic ciphertext by using a public key after converting the message into a polynomial (or vector) belonging to a ring.

In addition, when the homomorphic ciphertext is generated, the processor 450 may control the communication device 410 to store the homomorphic ciphertext in the memory 420 or transmit the homomorphic ciphertext to another device according to a user request or a preset default command.

In addition, according to an embodiment of the present disclosure, packing may also be performed. When packing is used in homomorphic encryption, multiple messages may be encrypted into one ciphertext. In this case, when the computing apparatus 400 performs computing between respective ciphertexts, the computing for the multiple messages may be processed in parallel as a result, and thus, a computing burden is greatly reduced.

Specifically, when a message is composed of a plurality of message vectors, the processor 450 converts the plurality of message vectors into a polynomial that may be encrypted in parallel. In addition, the converted polynomial may be multiplied by a scaling vector and may be homomorphically encrypted by using a public key. Accordingly, a ciphertext may be generated by packing a plurality of message vectors.

When a homomorphic ciphertext needs to be decrypted, the processor 450 applies a secret key to the homomorphic ciphertext to generate a decrypted text of a polynomial type. In addition, a message may be generated by decoding the decrypted text of a polynomial type.

In addition, the processor 450 may perform a preprocessing process for machine learning while maintaining an encrypted state of a private variable (personal information) in the received message (or data).

Specifically, the processor 450 may segment classifying whether data included in the received message (or an input dataset) is data related to which information. That is, the processor 450 receives a dataset including encrypted data or a dataset including encrypted (homomorphic encryption) data, and may perform segment classification on which of a plurality of items such as age, gender, race, and the like In addition, a first distribution average of a first classification value, which is a segment classification result value, may be derived, and a second distribution average value may be derived by adding a weighted value to the first distribution average value.

In addition, the processor 450 may perform computing and regression learning of data including a password by using a second classification value corresponding to the second distribution average value and the second distribution average value. Specific details of segment classification and weighted-value setting will be described with reference to FIG. 3 below.

In addition, the processor 450 may perform computing for a ciphertext. Specifically, the processor 450 may perform computing such as addition, subtraction, and multiplication while maintaining an encryption state with respect to a homomorphic ciphertext.

In addition, the processor 450 may perform ridge regression for a ciphertext. The ridge regression is a linear regression model with added regulation. The linear regression model is a model that performs prediction by making a linear function for input characteristics, and a general linear regression is a model with an added regulation term in that overfitting may occur. A more detailed description of the ridge regression is made below.

In addition, when computing is completed, the computing apparatus 400 may detect data of an effective area from computing result data. Specifically, the computing apparatus 400 may detect data in the effective area by rounding the computing result data. The rounding processing may refer to round-off of a message in an encryption state and may also be referred to as rescaling.

In addition, when an approximate message weight in a ciphertext exceeds a threshold as a result of computing, the computing apparatus 400 may reboot the ciphertext.

The computing apparatus 400 according to the present disclosure described above performs homomorphic encryption processing by separating private variables that require personal protection from variables that do not personal protection and performs computing, and thus, faster computing may be performed. In addition, more accurate solutions may be obtained efficiently by not using a gradient descent method in a learning process, and faster machine learning may be made because learning search required for performance optimization of the gradient descent method may be omitted.

Hereinafter, ridge regression used in the present disclosure is briefly described first.

The ridge regression is an essential element of various machine learning techniques for modeling a linear relationship between an input variable and a dependent variable. A matrix inversion operation consumes the most resources in the ridge regression learning process.

The present disclosure describes a ridge regression analysis method of encrypting only private variables by using homomorphic encryption. A task related to a ciphertext is minimized by dividing a ridge estimation equation into parts with private properties and parts without private properties. Then, optimization of calculation is performed by forcing duplicate columns of a decomposed matrix to be orthogonal to private properties.

The method according to the present disclosure may obtain an accurate solution more efficiently by not using a gradient descent method. In addition, search for learning required to optimize performance of the gradient descent method is omitted, and thus, faster processing may be performed.

In addition, many calculations are required to search for parameters in encrypted domains at the moment, and thus, related parameters are searched in advance by using a general text. However, this is not a practical method.

Hereinafter, an operation of homomorphic encryption used in the present disclosure will be described.

A homomorphic encryption scheme generally has the following structure.

KeyGen($I^\lambda$, $I^\tau$)→(sKey, pKey): Input security parameter $\lambda$ and function parameter $\tau$, and output secret key sKey and public key pKey.

Encrypt(pKey, m)→c: Output ciphertext c by using public key and input text m.

Dectypt(sKey, c)→m: Output decrypted text m by inputting secret key and ciphertext.

Evaluate(pKey, f, c)→$c_r$: Output vector of ciphertext for output of f with respect to vector of ciphertext as input of circuit f.

Homomorphic encryption has various application programs ranging from a simple query such as information search to a complex machine learning algorithm. The function parameter τ determines a depth boundary of a circuit in computing using a scheme.

An encryption system used to realize homomorphic encryption has been under development for many years, and an initial scheme only support addition or multiplication, and the homomorphic encryption is referred to as partial homomorphic encryption.

Recently, both addition and multiplication are supported, and noise is added to a ciphertext during an encryption process. In particular, multiplication increases noise more than addition. When noise exceeds a threshold, a ciphertext is in a state that may no longer be decrypted. As described above, a system that may only perform a certain number of operations according to an increase in noise is called some homomorphic encryption (SHE). In the SHE method, a method capable of accurately performing computation with a depth up to a certain level is called leveled homomorphic encryption (LHE). In contrast to this, a fully homomorphic encryption (FHE) scheme may handle any function with a random multiplication depth.

In addition, when homomorphic encryption is used, one thing to consider is use of a non-polynomial function. The non-polynomial function such as an exponential function has to be approximated as a polynomial function composed of only addition, multiplication, and so on, and higher-order polynomial computation is required to ensure high precision.

Recently, an iterative method is used to approximate a higher-order polynomial, but the iterative method increases a multiplication depth. In addition, matrix inversion computation requires multiple matrix multiplication and may be approximated by using a known algorithm such as a Schulz's algorithm for numerical safety, but many approximations are required for many resources.

As described above, in order to perform machine learning in a state in which personal information is protected, a homomorphic encryption scheme has to be used. However, the existing machine learning requires many matrix multiplications that increase a multiplication depth in homomorphic encryption, and thus, there is a problem that many resources are required to execute an algorithm used in the known machine learning as it is in the homomorphic encryption method.

Hereinafter, in order to solve the above-described problem, a regression analysis method using homomorphic encryption according to the present disclosure will be described below.

In addition, in order to perform computation of ciphertexts, the number of plain text slots for each ciphertext has to be the same. That is, the number of data may be different for each data owner, and the user terminal 100 needs to determine sizes of the plain text slots in advance. That is, when the number of data points included in the user terminal 100 is r and a size of a plain text slot is N, a data owner needs to divide each column into r/N pieces and fill the last piece with 0. Here, a length is N.

Such setting is not different from that the user terminal 100 owns several data. Accordingly, a regression analysis method will be described below on the assumption that the second server 300 of FIG. 1 includes all data.

A linear model is a method of performing prediction by making a linear function for input characteristics. In order to increase the linear prediction (accuracy), several regularization methods may be used. Although the present disclosure makes description by using ridge regression among various regularization methods, the present disclosure may be applied to other regression methods as well as the above-described ridge regression method.

Hereinafter, a case in which there is one private variable will be described first. For example, when one dependent variable Y, p independent non-private variables $X_1, X_2, \ldots, X_p$), and one private variable $X_n$ are used, a corresponding linear model may be represented by Equation 1 below.

$$Y = \beta_0 + \beta_1 X_1 + \beta_2 X_2 + \ldots + \beta_p X_p + \beta_s X_s + \varepsilon \quad \text{Equation 1}$$

Here, Y is a dependent variable, $X_1, X_2, \ldots, X_p$ are p independent non-private variables, $X_s$ is a private variable, $\beta_1 = (\beta_0, \beta_1, \ldots, \beta_p \beta_s)^T$ is a regression coefficient to be estimated, and ε is an error term. In addition, an i-th observation value of $X_1, X_2, \ldots, X_p, X_s$, and Y are represented as xi1, $x_{ip}, x_{is}, y_i$ (here, I=1, . . . , n). It is assumed that n>p+1, which is an assumption that there are more observation values than the number of independent variables.

In a case in which there is one private variable and a plurality of non-private variables described above, when homomorphic encryption is applied to the private variable, data to be transmitted from the user terminal 100 to the second server 300 is $(x_{i1}, \ldots, x_{ip}, h(x_{is}), y_i)$.

Hereinafter, a case in which homomorphic encryption is applied to the data will be described. $hi = h(x_{is})$ is fully homomorphic encryption for the private variable $x_{is}$. Hereinafter, for the sake of convenience, computation between a general text and a ciphertext or computation between ciphertexts are all represented in plain text.

In this case, $h(x_{ij}) - \bar{h}_s$ may be used to replace each $x_{ij}$ with $x_{ij} - \bar{h}_p$, $$\bar{y} = \sum_{i=1}^{n} y_i$$

is estimate as $\beta_0$, and a regression model without intercept may be represented by Equation 2 below.

$$y_t = \beta_1 x_{i1} + \beta_2 x_{i2} + \ldots + \beta_p x_{ip} + \beta_s h(x_{is}) + \varepsilon_i, i+1, \ldots, n \quad \text{Equation 2}$$

$$y = X\beta + \varepsilon = \underbrace{\begin{bmatrix} x_{11} & \ldots & x_{1p} & h(x_{1s}) \\ \vdots & \ddots & \vdots & \vdots \\ x_{i1} & \ldots & x_{ip} & h(x_{is}) \\ \vdots & \ddots & \vdots & \vdots \\ x_{n1} & \ldots & x_{np} & h(x_{ns}) \end{bmatrix}}_{X} \underbrace{\begin{bmatrix} \beta_1 \\ \vdots \\ \beta_p \\ \beta_s \end{bmatrix}}_{\beta} + \underbrace{\begin{bmatrix} \varepsilon_1 \\ \varepsilon_2 \\ \vdots \\ \varepsilon_n \end{bmatrix}}_{\varepsilon}$$

Here, X is a matrix having private and non-private variables (may be referred to as a matrix corresponding to a dataset), β is a regression coefficient, and ε is an error term.

In order to control overfitting, when a regularization term is added to an error function, the total error function may be minimized as Equation 3 below.

$$\varepsilon(\beta) = \varepsilon_D(\beta) + \varepsilon_W(\beta) = \quad \text{Equation 3}$$

$$\frac{1}{2}\sum_{i=1}^{N}(y_i - (\beta_1 x_{i1} + \beta_2 x_{i2} + \ldots + \beta_p x_{ip} + \beta_s h(x_{is})))^2 + \frac{\lambda}{2}\beta^T\beta$$

Here, ε(β) is a total error term, $\varepsilon_D(\beta)$ is an error for a normalization term, and $\varepsilon_W(\beta)$ is an error term for regulation.

Accordingly, a solution of the ridge regression is represented by Equation 4 below.

$$\hat{\beta}_{RLS} = (X^T X + \lambda I_{p+1})^{-1} X^T y \quad \text{Equation 4}$$

Here, $\hat{\beta}_{RLS}$ is a solution of ridge regression, and $I_{p+1}$ is an identity matrix for $(p+1) \times (p+1)$. Intercept $\beta_0$ is not normalized because of centroid of a variable. Accordingly, a ridge estimated value may be represented by Equation 5 below.

$$\hat{f} = X(X^T X + \lambda I_{p+1})^{-1} X^T y = XX^T (XX^T + \lambda I_n)^{-1} y \quad \text{Equation 5}$$

Here, $\hat{f}$ is a ridge estimated value, and $XX^T$ is an $n \times n$ matrix. The latter part of Equation 5 is the same as $X^T(XX^T + \lambda I_n) = (X^T X + \lambda I_{p+1}) X^T$. The reason is the same as Equation 6. Therefore, $(X^T X + \lambda I_{p+1})^{-1} X^T = X^T (XX^T + \lambda I_n)^{-1}$.

$$XX^T = \sum_{i=1}^{p} x_i x_i^T + h_s h_s^T = X_{(-s)} X_{(-s)}^T + h_s h_s^T \quad \text{Equation 6}$$

Here, $h_s$ is $(h(x_{1s}), \ldots, h(x_{ns}))^\tau$, $X_{(-s)}$ is another part of $X$, and when using a Sherman-Woobury inversion formula, Equation 7 is obtained.

$$\begin{aligned}(XX^T + \lambda I_n)^{-1} &= \\ (X_{(-s)} X_{(-s)}^T + \lambda I_n + h_s h_s^T)^{-1} &= (X_{(-s)} X_{(-s)}^T + \lambda I_n)^{-1} - \\ & \frac{(X_{(-s)} X_{(-s)}^T + \lambda I_n)^{-1} h_s h_s^T (X_{(-s)} X_{(-s)}^T + \lambda I_n)^{-1}}{1 + h_s^T (X_{(-s)} X_{(-s)}^T + \lambda I_n)^{-1} h_s} = \\ & A^{-1} - \frac{A^{-1} h_s h_s^T A^{-1}}{1 + h_s^T A^{-1} h_s}\end{aligned} \quad \text{Equation 7}$$

Here, $A = X_{(-s)} X_{(-s)}^T + \lambda I_n$. $X_{(-s)} = U \Sigma V^T$ (here, $U \in \Re^{n \times n}$, $V \in \Re^{p \times p}$ are an orthogonal matrix, and $\Sigma \in \Re^{n \times p}$ is a diagonal matrix having a diagonal component $(\sigma_1 \geq \ldots \geq \sigma_p)$. When single vector decomposition (SVD) is used, the SVD may be represented by Equation 8.

$$A^{-1} = (X_{(-s)} X_{(-s)}^T + \lambda I_n)^{-1} = (U \Sigma \Sigma^T U^T + \lambda I_n)^{-1} = U(\Sigma \Sigma^T + \lambda I_n)^{-1} U^T \quad \text{Equation 8}$$

Here, $\sigma_{p+1} = \ldots = \sigma_n = 0$ and is defined by the following term.

$$\xi = h_s^T A^{-1} h_s = \quad \text{Equation 9}$$

$$h_s^T U \left(\sum \sum^T + \lambda I_n\right)^{-1} U^T h_s = \sum_{j=1}^{n} h_s^T u_j \frac{1}{\sigma_j^2 + \lambda} u_j^T h_s = \sum_{j=1}^{n} \frac{(h_s^T u_j)^2}{\sigma_j^2 + \lambda}$$

$$\eta = h_s^T A^{-1} y = h_s^T U \left(\sum \sum^T + \lambda I_n\right)^{-1} U^T y = \sum_{j=1}^{n} \frac{(h_s^T u_j)(u_j^T y)}{\sigma_j^2 + \lambda}$$

Accordingly, ridge estimation is represented by Equation 10 below.

$$\hat{f} = XX^T (XX^T + \lambda I_n)^{-1} y = \quad \text{Equation 10}$$

$$(XX^T + \lambda I_n - \lambda I_n)(XX^T + \lambda I_n)^{-1} y = y - \lambda (XX^T + \lambda I_n)^{-1} y =$$

$$y - \lambda A^{-1} y + \lambda \frac{A^{-1} h_s h_s^T A^{-1}}{1 + h_s^T A^{-1} h_s} y = y - \lambda A^{-1} y + \frac{\lambda \eta}{1 + \xi} A^{-1} h_s =$$

-continued $$y - \lambda U \left(\sum \sum^T + \lambda I_n\right)^{-1} U^T y + \frac{\lambda \eta}{1 + \xi} U \left(\sum \sum^T + \lambda I_n\right)^{-1} U^T h_s =$$

$$y - \sum_{j=1}^{n} \frac{\lambda u_j (u_j^T y)}{\sigma_j^2 + \lambda} + \frac{\lambda \eta}{1 + \xi} \sum_{j=1}^{n} \frac{u_j (u_j^T h_s)}{\sigma_j^2 + \lambda} =$$

$$\sum_{j=1}^{n} \frac{\sigma_j^2}{\sigma_j^2 + \lambda} u_j (u_j^T y) + \frac{\lambda \eta}{1 + \xi} \sum_{j=1}^{n} \frac{u_j (u_j^T h_s)}{\sigma_j^2 + \lambda}$$

Here, $u_j$ is a column of $U \in \Re^{n \times n}$, and $\sum_{j=1}^{n} u_j u_j^T = I_n$.

In the above calculation, n summations are included. In order to simplify the calculation, $U = [U_1, U_2] \in \Re^{n \times n}$ (here, $U = [U_1, U_2] \in \Re^{n \times n}$, $U_2 = [u_{p+1}, \ldots, u_n] \in \Re^{n \times (n-p)}$, $U_1 \perp U_2$) is used.

In order to reduce SVD, u2 may be selected within a range that satisfies $\sigma_{p+1} = \ldots = \sigma_n = 0$, $U_1 \perp U_2$. In addition, $u_{p+1}$ is selected such that $u_j$ is orthogonal to $h_s$, and up+1 orthogonal to $h_s$ for all of $j = p+2, \ldots, n$ may be selected. Here, U1 is represented in Equation 11.

$$\hat{u}_{p+1} = (I_n - P_{U1}) h_s = \left(I_n - \sum_{i=1}^{p} u_i u_i^T\right) h_s = h_s - \sum_{i=1}^{p} u_i (u_i^T h_s) \quad \text{Equation 11}$$

$$u_{p+1} = \hat{u}_{p+1} / \|\hat{u}_{p+1}\|$$

$$u_{p+1} (u_{p+1}^T h_s) = h_s - \sum_{i=1}^{p} u_i (u_i^T h_s)$$

Therefore, $\eta$ and $\xi$ may be simplified as follows.

$$\eta = \sum_{j=1}^{p+1} \frac{h_s^T u_j}{\sigma_j^2 + \lambda} u_j^T y = \quad \text{Equation 11}$$

$$\sum_{j=1}^{p} \frac{h_s^T u_j}{\sigma_j^2 + \lambda} u_j^T y + \frac{1}{\lambda} y^T u_{p+1} (u_{p+1}^T h_s) = \sum_{j=1}^{p} \frac{(h_s^T u_j)(u_j^T y)}{\sigma_j^2 + \lambda} +$$

$$\frac{1}{\lambda} y^T \left(h_s - \sum_{j=1}^{p} u_j (u_j^T h_s)\right) = \frac{1}{\lambda} \left[-\sum_{j=1}^{p} \frac{\sigma_j^2 (h_s^T u_j)(u_j^T y)}{\sigma_j^2 + \lambda} + y^T h_s\right]$$

$$\xi = \sum_{j=1}^{p+1} \frac{(h_s^T u_j)^2}{\sigma_j^2 + \lambda} = \sum_{j=1}^{p} \frac{(h_s^T u_j)^2}{\sigma_j^2 + \lambda} + \frac{1}{\lambda} h_s^T u_{p+1} (u_{p+1}^T h_s) =$$

$$\sum_{j=1}^{p} \frac{(h_s^T u_j)^2}{\sigma_j^2 + \lambda} + \frac{1}{\lambda} h_s^T \left(h_s - \sum_{j=1}^{p} u_j (u_j^T h_s)\right) = \frac{1}{\lambda} \left[-\sum_{j=1}^{p} \frac{\sigma_j^2 (h_s^T u_j)^2}{\sigma_j^2 + \lambda} + h_s^T h_s\right]$$

Accordingly, a ridge estimated value may be simplified as follows.

$$\hat{f} = \quad \text{Equation 13}$$

$$\sum_{i=1}^{p} \frac{\sigma_i^2}{\sigma_i^2 + \lambda} u_i (u_i^T y) + \frac{\lambda \eta}{1 + \xi} \sum_{j=1}^{p+1} \frac{u_j (u_j^T h_s)}{\sigma_j^2 + \lambda} = \sum_{i=1}^{p} \frac{\sigma_i^2}{\sigma_i^2 + \lambda} u_i (u_i^T y) +$$

$$\frac{\lambda \eta}{1 + \xi} \left[\sum_{j=1}^{p} \frac{u_j (u_j^T h_s)}{\sigma_j^2 + \lambda} + \frac{1}{\lambda} \left(h_s - \sum_{i=1}^{p} u_i (u_i^T h_s)\right)\right] =$$

$$\sum_{i=1}^{p} u_i \frac{\sigma_i^2}{\sigma_i^2 + \lambda} u_i^T y - \frac{\eta}{1 + \xi} \sum_{i=1}^{p} u_i \frac{\sigma_i^2 (u_i^T h_s)}{\sigma_i^2 + \lambda} + \frac{\eta}{1 + \xi} h_s$$

Only p summations are included here.

When all data used for regression analysis is homomorphically encrypted, it is difficult to decompose polynomial required for calculating an estimated value of a linear model as described above. However, in the present disclosure, homomorphic encryption processing is performed only for items that require private protection, and general variables that do not require private protection may be quickly processed by general matrix computation or so on. Accordingly, as described above, only the terms, which use a homomorphic encryption message, among polynomials required for calculating the estimated value of the linear model, are separately extracted, and the number of homomorphic computations may be greatly reduced by performing homomorphic computations only for corresponding terms.

In addition, in order to reduce calculation complexity in the homomorphic computation processing, a matrix constituting a dataset is decomposed into a first matrix including a homomorphic ciphertext and a second matrix that does not include the homomorphic ciphertext, and as the second matrix is orthogonal to the first matrix, the homomorphic computation may be more quickly performed in the above-described homomorphic computation process.

In addition, although it is described above that only one private variable is included in the above-described dataset, the dataset may include a plurality of private variables. For example, when gender and race are included in the same dataset, both need to be treated as private variables. Hereinafter, a case in which there is one private variable will be expanded to a case in which there are two private variables.

The case in which there are two private variables may be represented by Equation 14 below.

$$XX^T = \sum_{i=1}^{p} x_i x_i^T + hh^T + gg^T = X_{(-s)} X_{(-s)}^T + hh^T + gg^T \quad \text{Equation 14}$$

Here, $h=(h(x_{1s1}), \ldots, h(x_{ns1}))^T \in \Re^n$, $g=(g(x_{1s1}), \ldots, g(x_{ns1}))^T \in \Re^n$, and each is an encrypted private variable.

In the same manner as the previous method, an estimated value of ridge regression may be represented by Equation 15 below.

$$\hat{f} = \sum_{j=1}^{n} \frac{\sigma_j^2}{\sigma_j^2 + \lambda} u_j(u_j^T y) +$$

$$\frac{\lambda(\eta_1 + \xi_{22}\eta_1 - \xi_{12}\eta_2)}{(1+\xi_{11})(1+\xi_{22}) - \xi_{12}^2} \sum_{j=1}^{n} \frac{1}{\sigma_j^2 + \lambda} u_j(u_j^T h) +$$

$$\frac{\lambda(\eta_2 + \xi_{11}\eta_2 - \xi_{12}\eta_1)}{(1+\xi_{11})(1+\xi_{22}) - \xi_{12}^2} \sum_{j=1}^{n} \frac{1}{\sigma_j^2 + \lambda} u_j(u_j^T g) \quad \text{Equation 15}$$

Here, an intermediate value may be defined by Equation 16 below.

$$\xi_{11} = h^T A^{-1} h = \quad \text{Equation 16}$$

$$h^T U \left(\sum \sum^T + \lambda I_n\right)^{-1} U^T h = \sum_{j=1}^{n} h^T u_j \frac{1}{\sigma_j^2 + \lambda} u_j^T h = \sum_{j=1}^{n} \frac{(h^T u_j)^2}{\sigma_j^2 + \lambda}$$

$$\xi_{12} = h^T A^{-1} g = \sum_{j=1}^{n} h^T u_j \frac{1}{\sigma_j^2 + \lambda} u_j^T g = \sum_{j=1}^{n} \frac{(h^T u_j)(g^T u_j)}{\sigma_j^2 + \lambda}$$

-continued $$\xi_{22} = g^T A^{-1} g = \sum_{j=1}^{n} g^T u_j \frac{1}{\sigma_j^2 + \lambda} u_j^T g = \sum_{j=1}^{n} \frac{(g^T u_j)^2}{\sigma_j^2 + \lambda}$$

$$\eta_1 = h^T A^{-1} y = h^T U \left(\sum \sum^T + \lambda I_n\right)^{-1} U^T y = \sum_{j=1}^{n} \frac{(h^T u_j)(u_j^T y)}{\sigma_j^2 + \lambda}$$

$$\eta_2 = g^T A^{-1} y = g^T U \left(\sum \sum^T + \lambda I_n\right)^{-1} U^T y = \sum_{j=1}^{n} \frac{(g^T u_j)(u_j^T y)}{\sigma_j^2 + \lambda}$$

Specifically, U2 may be first freely selected as $U_1 \perp U_2$, orthogonal processing is performed, and then h is processed, and g may be applied later.

$u_j$ are orthogonal to h for all j=p+2, ..., n and
$u_j$ are orthogonal to g for all j=p+3, ..., n and
$u_{p+1}$ and $u_{p+2}$ are the complements of the orthogonal projections
h and g onto $U_1$ and $\lceil U_1, u_{p+1} \rceil$, respectively and $u_{p+1} \perp u_{p+2}$ The respective items in the above process are as follows.

$$\hat{u}_{p+1} = h - \sum_{i=1}^{p} u_i(u_i^T h)$$

$$u_{p+1} = \hat{u}_{p+1}/\|\hat{u}_{p+1}\|, \; u_{p+1}(u_{p+1}^T h) = h - \sum_{i=1}^{p} u_i(u_i^T h)$$

$$\hat{u}_{p+2} = g - \sum_{i=1}^{p+1} u_i(u_i^T g), \; u_{p+2} = \hat{u}_{p+2}/\|\hat{u}_{p+2}\|$$

Accordingly, referring to Equation 12 in the preceding private variable, each of $\xi_{11}, \xi_{12}$, and $\eta_1$ may be represented by simplifying Equation 17 as follows.

$$\xi_{11} = \sum_{j=1}^{n} \frac{(h^T u_j)^2}{\sigma_j^2 + \lambda} = \quad \text{Equation 17}$$

$$\sum_{j=1}^{p} \frac{(h^T u_j)^2}{\sigma_j^2 + \lambda} + \frac{1}{\lambda} h^T u_{p+1}(u_{p+1}^T h) = \frac{1}{\lambda}\left[-\sum_{j=1}^{p} \frac{\sigma_j^2 (h^T u_j)^2}{\sigma_j^2 + \lambda} + h^T h\right]$$

$$\xi_{12} = \sum_{j=1}^{n} \frac{(h^T u_j)(g^T u_j)}{\sigma_j^2 + \lambda} =$$

$$\sum_{j=1}^{p} \frac{(g^T u_j)(u_j^T h)}{\sigma_j^2 + \lambda} + \frac{1}{\lambda} g^T u_{p+1}(u_{p+1}^T h) = \frac{1}{\lambda}\left[-\sum_{j=1}^{n} \frac{\sigma_j^2 (h^T u_j)(g^T u_j)}{\sigma_j^2 + \lambda} + g^T h\right]$$

$$\eta_1 = \sum_{j=1}^{n} \frac{(h^T u_j)(u_j^T y)}{\sigma_j^2 + \lambda} =$$

$$\sum_{j=1}^{p} \frac{(y^T u_j)(u_j^T h)}{\sigma_j^2 + \lambda} + \frac{1}{\lambda} y^T \left(h - \sum_{j=1}^{p} u_j(u_j^T h)\right) = \frac{1}{\lambda}\left[-\sum_{j=1}^{n} \frac{\sigma_j^2 (h^T u_j)(y^T u_j)}{\sigma_j^2 + \lambda} + y^T h\right]$$

However, computation of $\xi_{22}, \eta_2$ includes $u_{p+2}$ being computed by using $u_{p+1}$, and thus, it seems more complicated. However, $\xi_{22}, \eta_2$ may be simplified by not using $u_{p+2}$. To this end, the following method of applying orthogonal processing g first and processing h later without loss of generality may be used.

$u_j$ are orthogonal to g for all j=p+2, ..., n and
$u_j$ are orthogonal to h for all j=p+3, ..., n and
$u_{p+1}$ and $u_{p+2}$ are the orthogonal projections of g and h onto $U_1$
and $\lceil U_1, u_{p+1} \rceil$, respectively and $u_{p+1} \perp u_{p+2}$ $$\hat{u}_{p+1} = g - \sum_{i=1}^{p} u_i(u_i^T g)$$

$$u_{p+1} = \hat{u}_{p+1}/\|\hat{u}_{p+1}\|, \; u_{p+1}(u_{p+1}^T g) = g - \sum_{i=1}^{p} u_i(u_i^T g)$$

$$\hat{u}_{p+2} = h - \sum_{i=1}^{p+1} u_i(u_i^T h), \; u_{p+2} = \hat{u}_{p+2}/\|\hat{u}_{p+2}\|$$

Equation 18

Therefore, $\xi_{22}, \eta_2$ may be simplified by Equation 19 below.

$$\xi_{22} = \sum_{j=1}^{n} \frac{(g_{s2}^T u_j)^2}{\sigma_j^2 + \lambda} = \sum_{j=1}^{p} \frac{(g_{s2}^T u_j)^2}{\sigma_j^2 + \lambda} + \frac{1}{\lambda} g_{s2}^T u_{p+1}(u_{p+1}^T g_{s2}) =$$

$$\frac{1}{\lambda}\left[-\sum_{j=1}^{p} \frac{\sigma_j^2(g_{s2}^T u_j)^2}{\sigma_j^2 + \lambda} + g_{s2}^T g_{s2}\right]$$

$$\eta_2 = \sum_{j=1}^{n} \frac{(g_{s2}^T u_j)(u_j^T y)}{\sigma_j^2 + \lambda} = \sum_{j=1}^{p} \frac{(y^T u_j)(u_j^T g_{s2})}{\sigma_j^2 + \lambda} + \frac{1}{\lambda} y^T\left(g_{s2} - \sum_{j=1}^{p} u_j(u_j^T g_{s2})\right) =$$

$$\frac{1}{\lambda}\left[-\sum_{j=1}^{p} \frac{\sigma_j^2(g_{s2}^T u_j)(y^T u_j)}{\sigma_j^2 + \lambda} + y^T g_{s2}\right]$$

Equation 19

Therefore, ridge estimate may be simplified by Equation 20 below.

$$\hat{f} = \sum_{j=1}^{p} \frac{\sigma_j^2}{\sigma_j^2 + \lambda} u_j(u_j^T y) +$$

$$\frac{(\eta_1 + \xi_{22}\eta_1 - \xi_{12}\eta_2)}{(1+\xi_{11})(1+\xi_{22}) - \xi_{12}^2}\left(h_{s1} - \sum_{j=1}^{p} \frac{\sigma^2}{\sigma_j^2 + \lambda} u_j(u_j^T h_{s1})\right) +$$

$$\frac{(\eta_2 + \xi_{11}\eta_2 - \xi_{12}\eta_1)}{(1+\xi_{11})(1+\xi_{22}) - \xi_{12}^2}\left(g_{s2} - \sum_{j=1}^{p} \frac{\sigma^2}{\sigma_j^2 + \lambda} u_j(u_j^T g_{s2})\right)$$

Equation 20

Even in a case of having two private variables as described above, it is possible to calculate the solution by using only a plurality of computations. Although only a case where there is one private variable and a case where there are two private variables are described above, but the same method may be applied to a case where there are three or more private variables.

Hereinafter, a configuration of the processor 450 will be described with reference to FIGS. 3 and 4.

Figure 3:
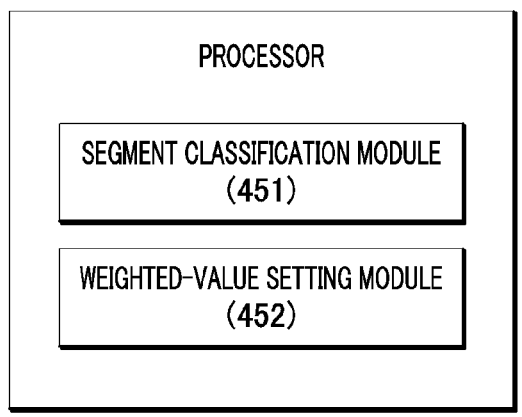
FIG. 3 is a block diagram illustrating a configuration of a processor according to an embodiment.

FIG. 3 is a block diagram illustrating a configuration of a processor according to an embodiment.

Referring to FIG. 3, the processor 450 includes a segment classification module 451 and a weighted-value setting module 452 that may additionally perform a preprocessing process to perform machine learning while maintaining an encryption state of the private variable described above.

The segment classification module 451 classifies an input message (a dataset without homomorphic encryption, a dataset including a homomorphic encryption). Specifically, the segment classification module 451 extracts a logit of the input dataset by using a classification model for extracting a logit of the input data. In this case, an extracted logit value corresponds to a probability value that the input data is classified into any one of a plurality of items such as age, gender, race, etc.

Accordingly, the segment classification module 451 derives the first classification value by extracting a logit of a dataset including homomorphic encryption. The first classification value corresponds to a probability value that data included in an input message (a dataset) as a logit value is classified into any one of segments.

In addition, the segment classification module 451 includes a classification model for extracting a logit and includes all learning models for extracting a logit of input data or performing segment classification, such as logistic regression learning. In addition, the segment classification module 451 may perform repetitive learning of the classification model by using data that does not include homomorphic encryption for learning the classification model.

The weighted-value setting module 452 derives a first distribution average value of a first classification value. In addition, the weighted-value setting module 452 derives a second distribution average value by adding a weighted value to the first distribution average value. The processor 450 performs computation of the homomorphic encryption data by using the derived second distribution average value and a second classification value corresponding to the second distribution average value.

The weighted-value setting module 452 derives a weighted value by performing average fitting to derive a weighted value of the first distribution average value. Specifically, the weighted-value setting module 452 derives a third classification value by inputting a dataset of data that does not include homomorphic encryption to the segment classification module 451 in order to set a weighted value. In addition, the weighted-value setting module 452 derives a third distribution average value that is a distribution average value of the derived third classification values.

The weighted-value setting module 452 derives a weighted value by performing average fitting of the first distribution average value and the third distribution average value. This is because a distribution (the first distribution average value) of the data including the homomorphic encryption may be different from a distribution of the data that do not include the homomorphic encryption (the third distribution average value).

For example, propensity of a person who want to provide his/her private information and a person who do not want to provide his/her private information may be very different from each other. Therefore, a difference between the two persons means that logit distributions thereof may be different from each other. Accordingly, in order to fit the logit distributions, average fit is used to equalize a weighted average of logits between the two persons. In this case, a reciprocal of a distribution average of segment variables is used as a weighted value in order to consider a distribution of actual segment variables (classification values of item). Accordingly, the weighted value needs to satisfy Equation 21 below.

$$\frac{\sum_i f_s(x_1^i)}{\sum_i y_1^i} = \frac{\sum_i f_s(x_2^i) + n_2\beta}{\sum_i y_2^i}$$

Equation 21

Here, assuming that a segment classification model is $f_s$, data and segment variables that do not include homomorphic encryption are $(x_1^i, y_1^i)$, and homomorphically encrypted data and segment variables are $(x_2^i, y_2^i)$, a weighted value to be added to the first classification value, which is an encrypted logit for average fitting, is $\beta$. In addition, n1 is the number of unencrypted data, and n2 is the number of encrypted data. Accordingly, a transformed logit is represented by Equation 22 below.

$$\tilde{l}_2{}^i = f_s(x_2{}^i) + \beta \qquad \text{Equation 22}$$

Here, $\tilde{l}_2{}^i$ means a transformed logit value.

Accordingly, by adding a weighted value to a first logit value, average fitting of a first distribution average value is performed. Movement of a distribution average due to the average fitting is described with reference to FIG. 4.

Figure 4:
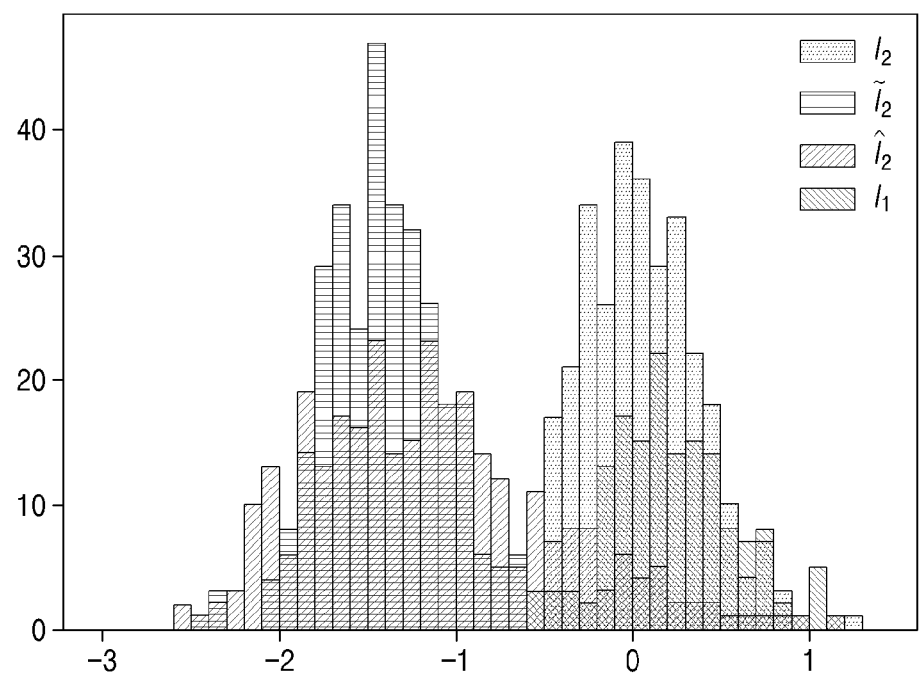
FIG. 4 is an example graph illustrating average fitting according to the embodiment.

FIG. 4 is an example graph illustrating average fitting according to the embodiment.

Referring to FIG. 4, $I_1$ represents a distribution of a third logit value which is a distribution value of the logit derived by performing logistic regression learning on a dataset that does not include homomorphic encryption. $\tilde{l}_2$ represents a distribution of a first logit value which is a distribution value of the logit derived by performing logistic regression learning on a dataset including homomorphic encryption.

However, when a classification model learned by using data that does not include homomorphic encryption derives a logit of data that includes homomorphic encryption, a distribution result biased toward a distribution of a dataset that does not include homomorphic encryption, such as $I_2$, is obtained.

Accordingly, when average fitting is performed by using Equation 21 and Equation 22, the biased distribution result such as $I_2$ is transformed to be close to a distribution of $\tilde{l}_2$ such as $\tilde{l}_2$. That is, by performing learning by using data that does not include homomorphic encryption, a logit distribution of data including homomorphic encryption is biased. In addition, the biased distribution may be corrected according to weighted-value setting using average fitting of the first distribution average value and the third distribution average value.

The processor 450 may perform computation or ridge regression learning in a state in which a private variable of an input message (data) is encrypted by using the second distribution value and the second distribution average value, which are logit values corrected according to the weighted-value setting.

Hereinafter, operations of the segment classification module 451 and the weighted-value setting module 452 will be described by using an example of a specific dataset.

A dataset of data that does not include a password is set as $\mathcal{D}_1 = \{(x_1{}^i, y_1{}^i) | i=1, \ldots, n_1\}$, and a dataset that includes a password is set as $\mathcal{D}_2 = \{(x_2{}^j, y_2{}^j) | j=1, \ldots, n_2\}$. In this case, it is assumed that I variables from among all of p+I variables are encrypted. That is, when encryption is represented as [ ], one sample of $\mathcal{D}_2$ is represented by Equation 23 below.

$$\mathcal{D}_2 = (x_{21}^j, \cdots x_{2p}^j, [x_{2(p+1)}^j], \cdots, [x_{2(p+I)}^j]) \qquad \text{Equation 23}$$

When a classification model included in the segment classification module 451 is set as $f_s$, $f_s(x)$ is derived as a logit value, and a probability of belonging to each segment may be derived from the logit.

Therefore, the segment classification module 451 derives a first classification value $l_2{}^j$ by applying $f_s$ to $x_2{}^j$. When the segment classification module 451 derives a logit value by using logistic regression, the logit value appears as inner product of the learned second weighted value and each $x_2{}^j$. Accordingly, it is possible to easily derive a logit value for encrypted data. In addition, the segment classification module 451 derives a third classification value by applying $f_s$ to D1.

The weighted-value setting module 452 derives a distribution $I_2$ of the derived first classification value $l_2{}^j$ and derives the distribution $I_1$ of the third classification value. In addition, average fitting of $I_1$ and $I_2$ is performed by using Equation 21 and Equation 22 described above. Accordingly, a weighted value $\beta$ for correcting $I_2$ is set according to the average fitting, and the corrected logit is represented as $\tilde{l}_2 = l_2 + \beta$.

The corrected logit $\tilde{l}_2$ may correspond to the third distribution or the third classification value. The processor 450 performs computation or ridge regression learning on $(x_2{}^j, \tilde{l}_2{}^j) | j = 1, \ldots, n_2$. Accordingly, the processor 450 enables machine learning to be performed in a state in which a private variable of an input message (data) is encrypted.

Hereinafter, a case in which the ridge estimation is applied to the HEAAN scheme will be described with reference to FIG. 5.

FIG. 5 is a diagram illustrating a basic operation for a homomorphic ciphertext according to an embodiment.

A main function of the HEAAN scheme has a unique operation of encoding a general text vector into a ring (or an anulus) before encryption. Specifically, a message may be encoded into a vector belonging to a ring, and the encoded message may be converted into a homomorphic ciphertext by using a public key. In contrast to this, in a decryption process, a decoding procedure for converting a ciphertext into a vector is performed, and the converted vector may be decrypted by using a secret key to restore a message.

Through encoding described above, the HEAAN scheme supports encryption for complex vectors, and SMID operation may also be performed.

Decoding is the same as an inverse operation of encoding and is performed after the decoding operation.

FIG. 6 illustrates an example of a processing function for a homomorphic ciphertext according to an embodiment.

FIG. 6 illustrates computation operations for integer addition, addition, integer multiplication, and multiplication computation in the HEAAN scheme. Computations for specific functions may be performed by combining the basic computations.

In the illustrated example, Add and Mult represent addition and multiplication between ciphertexts, and ConstaAdd and ConsMult represent computations between ciphertexts and constant polynomials. The computations in the HEAAN scheme as well as a parallel computation support method are performed by a slot method, and thus, as many computations as the number of general text slots may be performed at once.

In addition, the HEAAN scheme may perform not only the above-described computations but also left rotate, right rotate, and rescale. Here, the left rotate applies rotation to the left in a slot direction, and right rotate applies rotation to the right in the slot direction.

This method is useful when adding the same value to a ciphertext and enables efficient parallel operation. The rescale may be performed after every ConstMult or Mult in order to reduce a size of an error. However, the rescale reduces a ciphertext modulus, and thus, the number of operations may be limited without bootstrap.

In addition, the ridge regression requires as many additions as the number of variables, and thus, it is possible to put each private variable in a ciphertext and group all values in each column into one ciphertext. Here, the greatest number of general texts that may be compressed into one ciphertext is determined by a security parameter of homomorphic ciphertexts. Hereinafter, it is assumed that a length of a column does not exceed a value of the security parameter. When the length of the column exceeds the value of the security parameter, each column has to be decomposed into several ciphertexts, but even when the ciphertext is decomposed into several ciphertexts, this does not significantly affect complexity of the ridge regression algorithm. In addition, scalar values such as η and ξ may be included in the ciphertexts, which may be treated as vectors repeating the same value as many as the number of slots.

In addition, packing is applied to homomorphic ciphertexts. When the packing is used for homomorphic encryption, it is possible to encrypt multiple messages with one ciphertext. In this case, when a computing apparatus performs computation between respective ciphertexts, computations for a plurality of messages are processed in parallel as a result, and thus, a computation burden is greatly reduced. As illustrated in FIG. 9, addition or multiplication for a plurality of messages may be performed through addition or multiplication for two packed ciphertexts.

FIG. 7 illustrates an intermediate value calculation algorithm for ridge regression according to an embodiment. Specifically, FIG. 7 illustrates a method of calculating an intermediate value for estimating ridge regression when only one private variable is included.

Referring to FIG. 7, an intermediate value included in Equation 15 or Equation 20 described above may be calculated by using ConstMult, Mult, IRotate, ADD, and so on supported by the HEAAN scheme.

FIG. 8 illustrates an operation of calculating a ridge estimation value according to an embodiment.

Referring to FIG. 8, a final ridge regression estimation value is calculated by using the intermediate value calculated in FIG. 7. For the sake of convenience, a rescaling operation after a multiplication operation is omitted. When using homomorphic rotation, it is possible to calculate the sum of n elements in a ciphertext in log n times. Accordingly, complexity of the algorithm illustrated in FIG. 7 is o (p log n).

Figures 9C, 10:
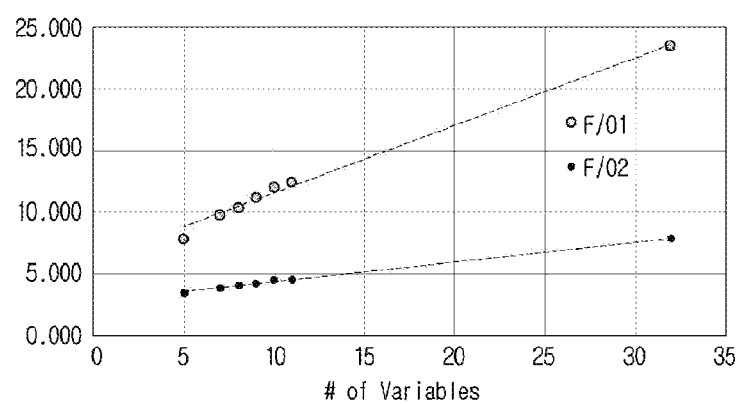

FIG. 10 is a graph illustrating performance of a ridge regression operation according to an embodiment. Specifically, each point in FIG. 10 represents a result of one dataset, and an x axis and a y axis respectively represent the number of columns and a performance ratio. The performance ratio of the y axis may mean a ratio of computation time.

Referring to FIG. 10, F/O1 represents (computation time of a comparison model in which all variables are encrypted)/(computation time of a model in which only one variable is encrypted). F/O2 represents (computation time of a comparison model in which all variables are encrypted)/(computation time of a model in which only two variables are encrypted).

Referring to FIG. 10, there is a linear relationship between the number of columns and a performance ratio (a computation time ratio). In addition, it may be confirmed that, when the number of columns in the dataset is small, a method according to the present disclosure may be performed more efficiently. In contrast to this, when the number of columns in the dataset is large, the method may be interpreted to be inefficient, but compared to the known method, faster computation may be performed because the method according to the embodiment does not use a gradient descent method resulting in no need to search for a learning rate.

Hereinafter, an encryption data processing method according to an embodiment will be described with reference to FIG. 11.

Figure 11:
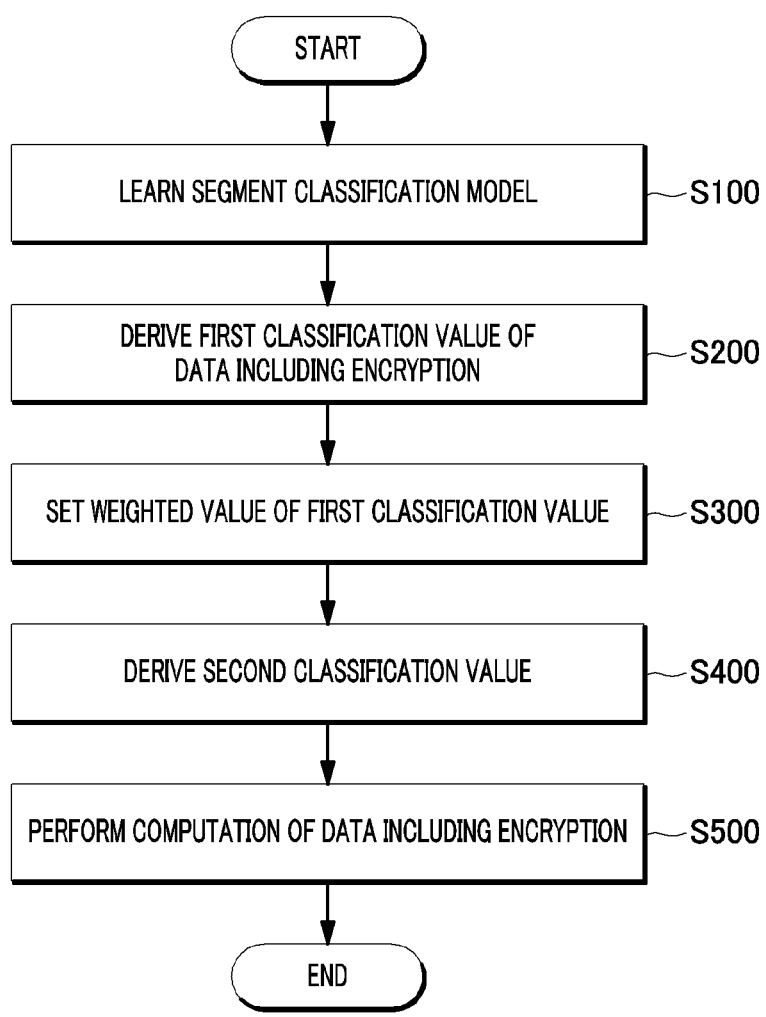
FIG. 11 is a flowchart of an encryption data processing method according to an embodiment.

FIG. 11 is a flowchart of an encryption data processing method according to an embodiment.

Referring to FIG. 11, the processor 450 learns a segment classification model for deriving a probability value that input data is classified into any one of segments (S100). In this case, the processor 450 learns the segment classification model by using a dataset that does not include a password.

In addition, the processor 450 derives a first classification value that is a segment classification value of an input message (data) or a dataset including homomorphic encryption (S200). Specifically, the segment classification module 451 extracts a logit of the input dataset by using a classification model capable of extracting the logit of the input data. In this case, the extracted logit value corresponds to a probability value that the input data is classified into any one of segments.

The classification model is trained by using a dataset that does not include homomorphic encryption. Accordingly, when data including encryption is input, a distribution bias occurs. In order to correct the distribution bias, the processor 450 sets a weighted value of the first classification value (S300).

In order to set a weighted value, the weighted-value setting module 452 derives a first distribution average value of the first classification value. In addition, the weighted-value setting module 452 derives a second distribution average value by adding a weighted value to the first distribution average value. The processor 450 calculates the homomorphic encryption data by using the derived second distribution average value and a second classification value corresponding to the second distribution average value.

Specifically, the processor 450 inputs a dataset of data that does not include homomorphic encryption into the segment classification module 451 to derive a third classification value. Then, the weighted-value setting module 452 derives a third distribution average value that is a distribution average value of the derived third classification values. The weighted-value setting module 452 derives a weighted value by performing average fitting of the first distribution average value and the third distribution average value by using Equation 21 and Equation 22 described above.

Accordingly, the processor 450 derives the second classification value obtained by correcting the weighted value of the first classification value (S400). Then, the processor 450 performs computation and learning of the input data by using the derived second classification value and the second distribution value (S500). In this case, the computation and learning of the input data (homomorphic encryption data) will be described in detail with reference to FIG. 12 to be described below.

Figure 12:
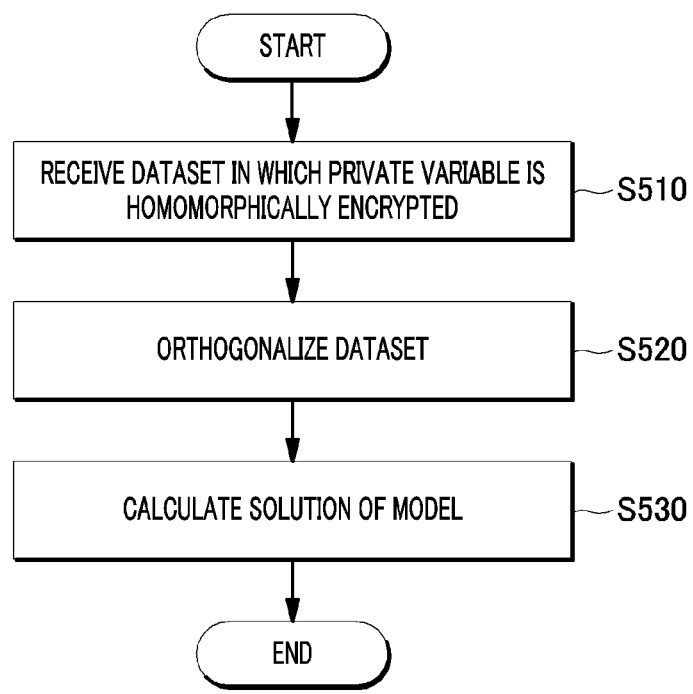
FIG. 12 is a flowchart of a method for calculating and learning encryption, data according to an embodiment.

FIG. 12 is a flowchart illustrating a method of processing input data (homomorphic encryption data) according to an embodiment.

12 is a flowchart of a method of calculating and learning encrypted data according to an embodiment.

First, a dataset including a homomorphic encryption message (encrypted data) and a non-homomorphic-encrypted message (unencrypted data) as a slot is received and stored (S510). The dataset may be masked as described above, and the dataset may include only one private variable but may also include a plurality of private variables. In addition, the included private variables are homomorphically encrypted, and thus, personal information may be protected by a device receiving a corresponding dataset.

An estimation value of the linear model is calculated by applying the homomorphic encryption message and the non-homomorphic-encrypted message in the dataset to the pre-stored linear model. Specifically, an estimation value may be calculated by extracting a term using a homomorphic encryption message among polynomials required for calculating an estimation value of a linear model and by performing homomorphic computation for the extracted term. As such, not all variables in the dataset are homomorphically encrypted, and only private variables that require personal protection are homomorphically encrypted. Therefore, it is possible to distinguish terms that use homomorphic encryption messages and terms that do not use the homomorphic encryption messages, among polynomials required for calculating the estimation value of the linear model, and to perform computation by performing a homomorphic computation method only for terms using the homomorphic encryption message.

In addition, in order to perform faster computation in the homomorphic computation process, a matrix corresponding to the dataset is decomposed into a first matrix including the homomorphic encryption message and a second matrix that does not include the homomorphic encryption message, and processing of enabling the second matrix to be orthogonal to the first matrix may be performed (S520). In the computation process, the estimation value for the linear model may be quickly calculated (S530).

By completing the above-described computation, a process of transmitting the computation result to another device may be performed, or a computation result may also be decrypted with a secret key.

As described above, a ciphertext processing method according to the present disclosure may perform faster computations by distinguishing private variables that require personal protection from private variables that do not require personal protection and processing homomorphic encryption and computations. In addition, by not using a gradient descent method in the learning process, more accurate solutions may be obtained efficiently, and a learning rate search required for performance optimization of the gradient descent method may be omitted, and thus, faster machine learning may be performed.

In addition, the ciphertext processing method according to the various embodiments described above may be stored and distributed in a recording medium in the form of a program code for performing respective steps. In this case, the device on which the recording medium is mounted may perform operations such as the encryption or the ciphertext processing described above.

The recording medium may include various types of computer-readable media such as ROM, RAM, a memory chip, a memory card, an external hard disk drive, a hard disk drive, a compact disk (CD), digital video disk (DVD), a magnetic disk, and a magnetic tape.

Although the present disclosure is described with reference to the accompanying drawings, the scope of the present disclosure is determined by following claims and should not be construed as being limited to the above-described embodiments and/or drawings. In addition, it should be clearly understood that improvements, changes, and modifications of the disclosure described in the claims, which are obvious to those skilled in the art are also included in the scope of the present disclosure.

The above descriptions on the present disclosure are examples, and those skilled in the art to which the present disclosure belongs may understand that the examples may be easily modified into other specific forms without changing the technical idea or essential features of the present disclosure. Therefore, it should be understood that the embodiments described above are illustrative in all respects and not restrictive. For example, each component described as a single type may be implemented in a distributed form, and likewise components described in the distributed form may be implemented in a combined form.

The scope of the present disclosure is indicated by the following claims rather than the detailed description made above, and all changes or modifications derived from the meaning and scope of the claims and their equivalent concepts should be interpreted as being included in the scope of the present disclosure.

The method and apparatus for securing private variables by using homomorphic encryption, according to an embodiment of the present disclosure may perform regression analysis by encrypting only private variables that require security among various variables.

What is claimed is:

1. A homomorphic encryption data processing method comprising:
    deriving a first classification value which is a segment classification value of a dataset including homomorphic encryption by inputting the dataset of data including the homomorphic encryption to a segment classification module for determining whether the data is about what kind of information, wherein the segment classification module was trained by using a non-homomorphic encryption dataset that does not include the homomorphic encryption;
    deriving a first distribution average value of the first classification value and deriving a second distribution average value by adding a weighted value to the first distribution average value;
    deriving a second classification value by using the second distribution average value; and
    performing computation of data including the homomorphic encryption by using the second classification value and the second distribution average value,
    wherein the weighted value is used to correct a distribution bias that occurs when data including homomorphic encryption is input to the segment classification module.

2. The homomorphic encryption data processing method of claim 1, wherein the deriving of the first classification value comprises:
    extracting a first logit of the dataset including the homomorphic encryption; and
    setting, as the first classification value, a value corresponding to probability that the data of the dataset including the homomorphic encryption from the first logit is classified into any one of segments.

3. The homomorphic encryption data processing method of claim 2, wherein the deriving of the second distribution average value comprises:
    deriving a third classification value that is a segment classification value of the dataset that does not include the homomorphic encryption by inputting the dataset of the data that do not include the homomorphic encryption to the segment classification module;
    deriving a third distribution average value that is a distribution average value of the third classification value; and
    setting the weighted value such that the first distribution average value is equal to the third distribution average value by performing average fitting of the first distribution average value and the third distribution average value.

4. The homomorphic encryption data processing method of claim 3, wherein the performing of the computation of the data including the homomorphic encryption comprises:
storing a first dataset including data including the homomorphic encryption and data that do not include the homomorphic encryption as a slot;
calculating an estimation value for a previously stored linear model by applying the homomorphic encryption data and the non-homomorphic encryption data in the first dataset to the linear model; and
transmitting the calculated estimation value to an external apparatus.

5. The homomorphic encryption data processing method of claim 4, wherein the calculating of the estimation value comprises extracting a term using the homomorphic encryption data from among polynomials required for calculating the estimation value of the linear model and calculating the estimation value by performing homomorphic computation for the extracted term.

6. The homomorphic encryption data processing method of claim 5, wherein the calculating of the estimation value comprises:
generating a matrix corresponding to the first dataset;
decomposing the matrix into a first matrix including the homomorphic encryption data and a second matrix that does not include the homomorphic encryption data;
enabling the second matrix to be orthogonal to the first matrix; and
calculating the estimation value for the linear model by using the first matrix and the second matrix.

7. The homomorphic encryption data processing method of claim 6, wherein the first dataset comprises a plurality of different variables, each homomorphically encrypted.

8. The homomorphic encryption data processing method of claim 7, wherein the linear model is a ridge regression linear model.

9. A homomorphic encryption data computing apparatus comprising:
a memory storing at least one instruction; and
a processor configured to execute the at least one instruction,
wherein the processor executes the at least one instruction to:
classify whether data is about what kind of information,
derive a first classification value that is a segment classification value of a dataset of data including a homomorphic encryption by inputting the dataset of data including the homomorphic encryption to a segment classification module, wherein the segment classification module was trained by using a non-homomorphic encryption dataset that does not include the homomorphic encryption,
derive a first distribution average value of the first classification value,
drive a second distribution average value by adding a weighted value to the first distribution average value,
drive a second classification value by using the second distribution average value, and
calculate data including a homomorphic encryption by using the second classification value and the second distribution average value,
wherein the weighted value is used to correct a distribution bias that occurs when data including homomorphic encryption is input to the segment classification module.

10. The homomorphic encryption data computing apparatus of claim 9, wherein the processor extracts a first logit of the dataset including the homomorphic encryption, and sets, as the first classification value, a value corresponding to probability that the data of the dataset including the homomorphic encryption from the first logit is classified into any one of segments.

11. The homomorphic encryption data computing apparatus of claim 10, wherein the processor derives a third classification value which is a segment classification value of a dataset that does not include the homomorphic encryption by inputting the dataset of the data that do not include the homomorphic encryption to the segment classification module, derives a third distribution average value that is a distribution average value of the third classification value, and sets the weighted value such that the first distribution average value is equal to the third distribution average value by performing average fitting of the first distribution average value and the third distribution average value.

12. The homomorphic encryption data computing apparatus of claim 11, wherein the processor performs repetitive learning of a classification process as to whether data is homomorphic encryption data by using the non-homomorphic encryption dataset.

13. The homomorphic encryption data computing apparatus of claim 12, wherein the processor stores a first dataset including data including the homomorphic encryption and data that do not include the homomorphic encryption as a slot and calculates an estimation value for a previously stored linear model by applying the homomorphic encryption data and the non-homomorphic encryption data in the first dataset to the linear model.

14. The homomorphic encryption data computing apparatus of claim 13, wherein the processor extracts a term using the homomorphic encryption data from among polynomials required for calculating the estimation value of the linear model and calculating the estimation value by performing homomorphic computation for the extracted term.

15. The homomorphic encryption data computing apparatus of claim 14, wherein the processor generates a matrix corresponding to the first dataset, decomposes the matrix into a first matrix including the homomorphic encryption data and a second matrix that does not include the homomorphic encryption data, enables the second matrix to be orthogonal to the first matrix, and calculates the estimation value for the linear model by using the first matrix and the second matrix.

16. The homomorphic encryption data computing apparatus of claim 15, wherein the first dataset comprises a plurality of different variables, each homomorphically encrypted.

17. The homomorphic encryption data computing apparatus of claim 16, wherein the linear model is a ridge regression linear model.

* * * * *

UNITED STATES PATENT AND TRADEMARK OFFICE
CERTIFICATE OF CORRECTION

| | | |
|---|---|---|
| PATENT NO. | : 12,425,181 B2 | |
| APPLICATION NO. | : 17/853798 | |
| DATED | : September 23, 2025 | |
| INVENTOR(S) | : Jae Wook Lee and Jun Young Byun | |

It is certified that error appears in the above-identified patent and that said Letters Patent is hereby corrected as shown below:

On the Title Page

Item (54), and in the Specification, Column 1, Lines 1-2:
USING HOMOMORPHIC ENCRYPTION WITH PRIVATEVARIABLES Should read as follows:
METHOD AND APPARATUS FOR PRIVACY PRESERVING USING HOMOMORPHIC ENCRYPTION WITH PRIVATE VARIABLES Signed and Sealed this
Eleventh Day of November, 2025

John A. Squires
*Director of the United States Patent and Trademark Office*